United States Patent [19]

Wheaton

[11] 4,267,898

[45] May 19, 1981

[54] MOTORIZED BICYCLE CONVERSION APPARATUS

[76] Inventor: George B. Wheaton, 147 Long Dr., SW., Marietta, Ga. 30060

[21] Appl. No.: 101,418

[22] Filed: Dec. 10, 1979

[51] Int. Cl.³ .............................................. B62M 7/08
[52] U.S. Cl. ..................................... 180/205; 180/219
[58] Field of Search ............... 180/205, 206, 207, 219, 180/220; 280/289 R, 289 A, 289 D; 403/344

[56] References Cited

U.S. PATENT DOCUMENTS

| | | | |
|---|---|---|---|
| 731,207 | 6/1903 | Nechlediel | 180/205 |
| 1,257,711 | 2/1918 | Johnson | 180/205 |
| 1,656,935 | 1/1928 | Bahan | 403/344 |
| 1,717,056 | 6/1929 | Mesinger | 280/202 |
| 2,067,839 | 1/1937 | Godfrey | 403/344 |
| 3,921,745 | 11/1975 | McCulloch et al. | 180/205 |
| 3,966,007 | 6/1976 | Havener et al. | 180/205 |
| 4,022,488 | 5/1977 | Likas | 280/289 A |

FOREIGN PATENT DOCUMENTS 151793  10/1920  United Kingdom ................ 180/205

Primary Examiner—John J. Love
Assistant Examiner—Donn McGiehan
Attorney, Agent, or Firm—Jones, Thomas & Askew

[57] ABSTRACT

Apparatus for converting a conventional bicycle to motorized drive. An engine supporting frame assembly is positioned above the rear wheel of the bicycle, and maintained in position by attachment to existing frame members of the bicycle. Driving power is imparted from the engine to the driven wheel of the bicycle through a power train including a driven pulley which is attached to the bicycle wheel through a clamp assembly including two clamp plates engaging the hub of the bicycle wheel.

2 Claims, 6 Drawing Figures

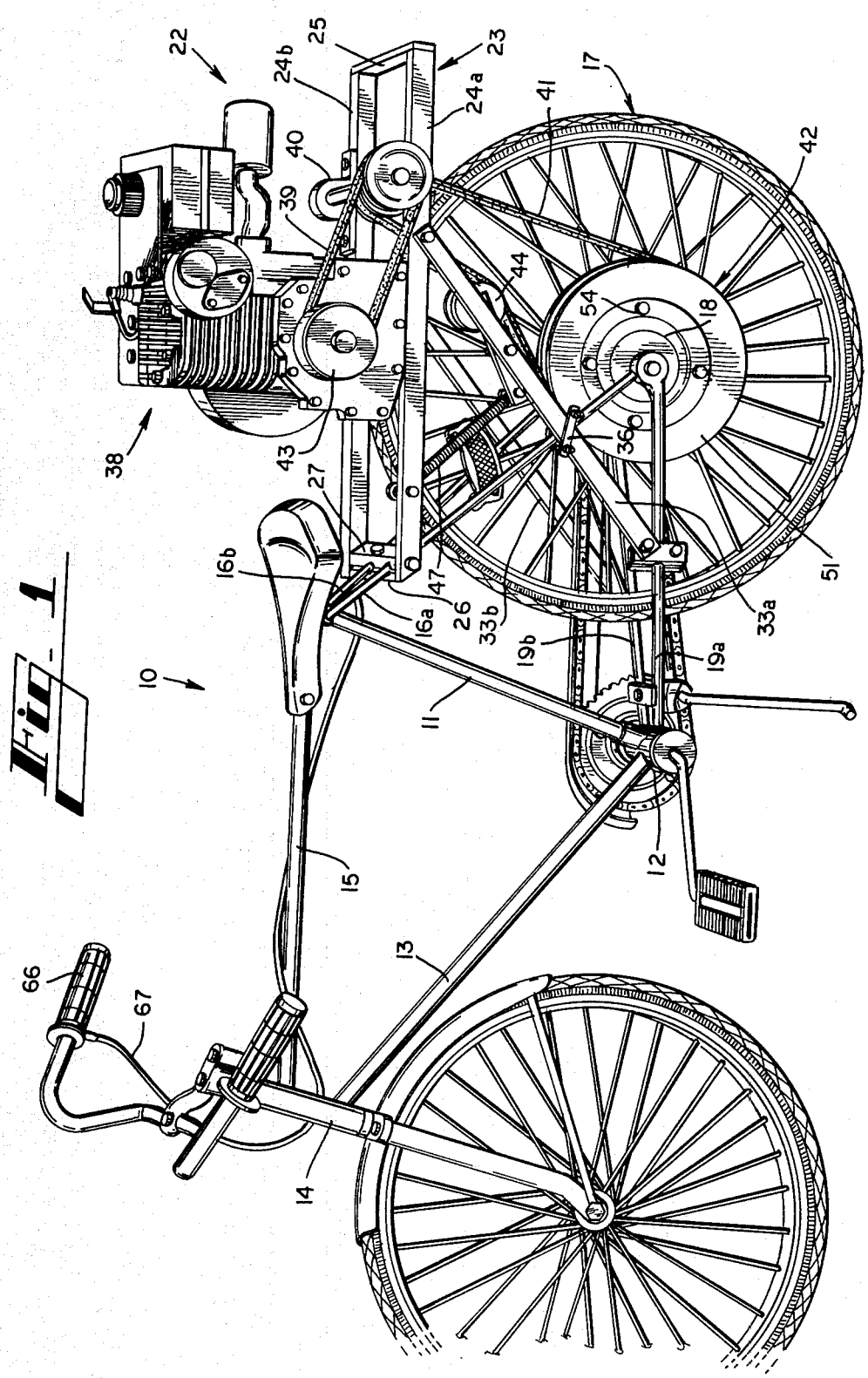

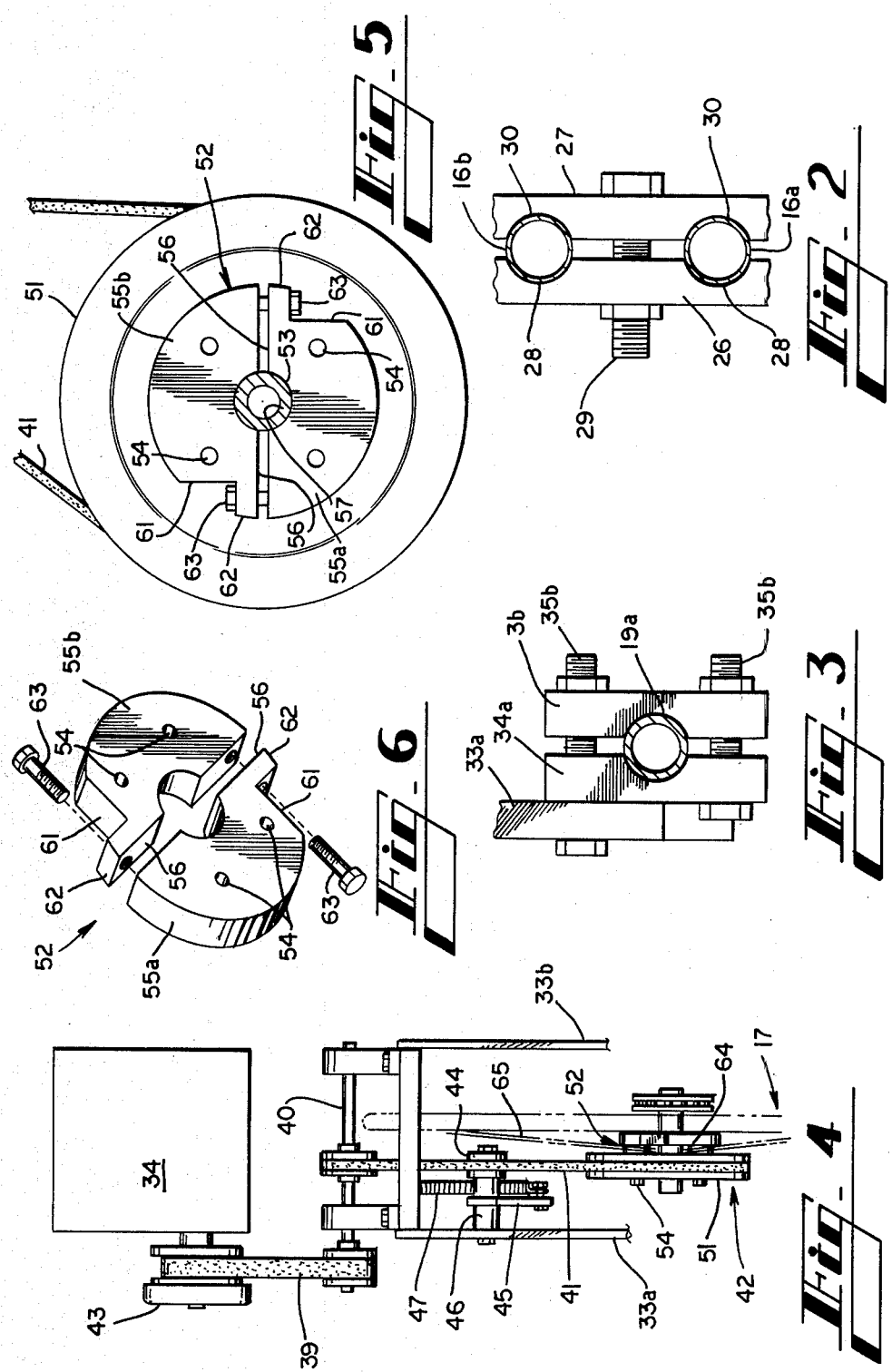

MOTORIZED BICYCLE CONVERSION APPARATUS

BACKGROUND OF THE INVENTION

This invention relates in general to motor-powered bicycles, and in particular to apparatus for converting a conventional bicycle to motorized operation.

Although bicycles and motorcycles have long been available as alternate modes of transportation in place of the automobile, the increasing cost and possible scarcity of hydrocarbon fuels are compounding the difficulty of operating an automobile and are making alternatives more attractive to many people. While the automobile remains the vehicle of choice for most medium and long range personal travel, many people are turning to relatively economical forms of transportation for relatively short-range travel such as commuting, shopping, and neighborhood visits. Motorcycles and their relatively lightweight counterpart, the mo-ped, are relatively economical to operate and provide popular alternatives to the automobile, although those vehicles can be relatively expensive to purchase.

The conventional bicycle is, for many people, another favored form of alternative transportation, although hilly terrain or long distances may place the bicycle beyond the practical use of many persons lacking the necessary stamina or endurance. Even where the terrain is relatively flat, the conventional bicycle may still be impractical for those who, because of age or infirmity, are simply unable to pedal any great distance without overtaxing themselves.

While it has been known in the art to convert or modify an existing pedal-powered bicycle to motorized operation, certain problems have been associated with prior-art apparatus for that purpose. Generally speaking, motorized bicycle conversions of the prior art have required either substantial modification to the bicycle structure itself, or have required special-purpose engines designed specifically to fit the purpose. Motor bike conversion apparatus of the kind requiring bicycle modification frequently renders the bicycle unfit for its original utility, so that the bicycle cannot readily be re-converted back to its original non-motorized state without making expensive repairs. Furthermore, such motorized conversion apparatus is typically expensive and time-consuming to install, and installing such conversion apparatus is usually well beyond the abilities of the average casual mechanic.

The motorized bicycle conversion kits requiring motors or engines of special design, for example, engines that fit within the bicycle frame, tend to be relatively expensive inasmuch as the special-design engine is usually available from only a single source and cannot be used for another purpose. Moreover, such conversion apparatus frequently is usable only with boys'-style bicycles, and not with bicycles traditionally styled for girls or women and lacking a frame member extending between the bicycle seat post and the fork-supporting tube.

SUMMARY OF INVENTION

Stated in general terms, the apparatus of the present invention includes a motor supporting frame which mounts above an existing wheel of a bicycle, such as the rear wheel, and a motor supported thereon and coupled for driving engagement with the bicycle wheel. The motor supporting frame includes apparatus for removably attaching the frame to existing structural members of the bicycle without requiring disfiguring operations such as welding or cutting of the existing bicycle frame. Stated somewhat more specifically, the frame apparatus according to the present invention clamps onto the existing bicycle frame members extending downwardly from the bicycle seat to the rear wheel axle, and also includes a pair of support braces extending downwardly from the motor support frame to the horizontal frame members on either side of the bicycle.

Another important feature of the present invention is the novel drive pulley, which quickly and positively attaches to the rear wheel of the bicycle without interfering with the spokes or hub of the rear wheel, and which is self-centering for concentricity with the motor-driven wheel of the bicycle.

Accordingly, it is an object of the present invention to provide improved apparatus for converting a bicycle to motorized operation.

It is another object of the present invention to provide motorized bicycle conversion apparatus which does not require modification of existing bicycle frame structure.

It is still another object of the present invention to provide motorized bicycle conversion apparatus which may use existing engines or motors of conventional design.

It is yet another object of the present invention to provide an improved conversion drive pulley for attachment to the driven wheel of a motorized bicycle.

The foregoing and other objects and advantages will become more apparent from the following description of a preferred embodiment of the invention.

BRIEF DESCRIPTION OF DRAWINGS

FIG. 1 is a pictorial view of motorized bicycle conversion apparatus according to a preferred embodiment of the present invention.

FIG. 2 is a sectioned detail view showing the engine frame front support connection to existing frame members of the bicycle, in the embodiment of FIG. 1.

FIG. 3 is a sectioned detail view showing attachment of an engine frame vertical support member to existing bicycle frame structure, in the embodiment of FIG. 1.

FIG. 4 is a rear elevation view of the disclosed embodiment showing details of the motorized drive train.

FIG. 5 is an elevation view of the conversion drive pulley, taken from the right side of the rear wheel in the embodiment of FIG. 1.

FIG. 6 is an exploded pictorial view of the hub clamp assembly forming part of the drive pulley shown in FIG. 5.

DESCRIPTION OF PREFERRED EMBODIMENT

Turning first to FIG. 1, there is shown generally at 10 a conventional bicycle equipped with motorized conversion apparatus according to an embodiment of the present invention. The bicycle 10 is of conventional construction in all respects, apart from the added conversion apparatus discussed hereinbelow, and includes a frame having a seat supporting post 11 extending downwardly to a bicycle crank housing assembly 12; a tube 13 extending forwardly and upwardly from the crank housing to the front fork tube 14; and the tubular frame member 15 extending rearwardly from the fork tube to join the upper end (not shown) of the supporting post 11. The existing conventional structure of the bicycle 10 further includes a pair of support tubes 16a and 16b, attached at upper ends to the seat supporting post 11 and extending downwardly alongside the rear wheel 17 to terminate at the axle mounting hub 18; and a pair of tubular frame members 19a and 19b extending forwardly from the axle mounting hub to the crank housing 12.

The motorized conversion apparatus is indicated generally at 22, and includes a frame assembly 23 mounted above the rear wheel 17 of the bicycle. The frame assembly 23 includes a pair of longitudinal frame members 24a and 24b symmetrically disposed with respect to the rear wheel 17, and a lateral support member 25 interconnecting the two frame members at the rear end of the frame assembly. The forward ends of the frame members 24a and 24b making up the frame assembly 23 are interconnected by a support member 26, which is positioned to fit immediately in front of the two support tubes 16a and 16b. As more specifically shown in FIG. 2, the support member 26 also forms part of a clamp for securing the frame assembly 23 to the support tubes 16a and 16b, and the support member may be formed with rearward-facing curved channels 28 positioned to receive the support tubes. The forward frame-engaging clamp for the frame assembly 23 also includes a plate 27 mounted behind the support member 26 and adjustably attached to that support member by means of the threaded fastener 29. The plate 27 preferably has another pair of channels 30 formed in confronting relation to the channels 28 formed in the rearwardly-facing surface of the support member 26, so that the support tubes 16a and 16b of the bicycle frame can be securely clamped between the support member 26 and the plate 27 by tightening the fastener 29.

Returning to FIG. 1, supporting struts 33a and 33b are secured to the corresponding frame members 24a and 24b of the frame assembly 23, at a point above and somewhat behind the axle 18 of the bicycle rear wheel, and the struts extend downwardly for attachment to the bicycle frame. Each of the supporting struts 33a and 33b is secured to the corresponding support tube 16a and 16b the point of closest proximity by clamps 36, only one of which is shown in FIG. 1, to prevent bending or excessive vibration of the supporting struts. The left strut 33a is attached to the structural member 19a as shown in FIGS. 1 and 3, by means of an adjustable clamp arrangement including a first clamping plate 34a and a second clamping plate 34b that straddle the structural member 19a. The clamping plates 34a and 34b are movably interconnected by a pair of bolts 35a and 35b, one of which also extends through the lower end of the strut 33a, and the clamping plates preferably have mating lateral channels on their confronting surfaces to provide a clamping recess for engaging the structural member 19a as particularly shown in FIG. 3. It will be understood that the lower end of the strut 33b is clamped to the structural member 19b, on the right side of the bicycle, by a clamping arrangement similar to that shown in FIG. 3.

Attached to the frame assembly 23 and extending upwardly therefrom is a suitable motor or engine such as the small gasoline-powered engine 38 depicted in FIG. 1 and diagrammatically indicated in FIG. 4; it will be understood by those skilled in the art that the choice of a particular type of engine is by way of example only, and that other types of motor power may be substituted. For example, the gasoline engine 38 could be replaced by an electric motor and a suitable storage battery, although the range of an electrically-powered bicycle obviously is limited by the periodic need to recharge the battery. Power is transmitted from the engine 38 to the rear wheel 17 of the bicycle by a suitable power train, best shown in FIGS. 1 and 4, which in the present embodiment includes a primary drive belt 39 extending from the engine to drive a counter shaft 40, and a secondary drive belt 41 extending downwardly from the counter shaft to the driven pulley 42 attached to the bicycle wheel 17. A centrifugal clutch 43 of conventional design connects the primary drive belt 39 to the output shaft of the engine 38, so that the engine is effectively uncoupled from the rear wheel 17 when the engine is operating at idle speed. The secondary drive belt 41 passes beneath an idler pulley 44, attached to an arm 45 pivotably mounted at 46 to the left strut 33a, to remove slack from the secondary drive belt. A spring 47 extends upwardly from the free end of the idler pulley arm 45 to terminate at a suitable location along the left frame member 24a, so as to provide suitable tension on the idler pulley 44. Use of the idler pulley in conjunction with the secondary drive belt permits a particular construction of the conversion apparatus 22, including a secondary drive belt of selected length, to be usable with bicycles of various design without the necessity of adjustable mounting structure for the engine 38 or the counter shaft 40.

The driven pulley 42, best seen in FIGS. 1 and 5, includes a sheave 5 engaged by the secondary drive belt 41, and the hub clamp assembly 52 (FIGS. 5 and 6). The sheave 51, which is located on the wheel 17 outside of the wheel spokes, may be provided by a conventional pulley of appropriate dimension and having a central opening sufficiently enlarged to clear the existing axle of the rear wheel 17. The hub clamp assembly 52 fits around the existing hub 53 of the rear wheel 17, within the spokes of that wheel, and is secured to the sheave 51 by means of bolts 54 extending through the clamp assembly and the sheave.

The hub clamp assembly 52 includes a pair of clamp plates 55a and 55b, each of which may be identical to the other for ease of manufacture. Each of the clamp plates 55a and 55b has the shape of a semicircular disk segment sufficiently narrow, when not connected to each other or to the sheave 51, to be insertable between the spokes of the bicycle wheel 17 and then positioned about the wheel hub 53 as shown in FIG. 5. Each of the clamp plates has a diametrical surface 56 with a semicircular recess 57 formed therein to receive the exterior surface of the hub 53. The depth of each recess 57 in the clamp plates 55a and 55b should be somewhat less than half the diameter of the hub 53 so that the confronting surfaces of the clamp plates, when interconnected to engage the hub 53 as shown in FIG. 5, do not actually contact each other.

A notch 61 is cut into the periphery of each clamp plate 55a and 55b, spaced a short distance inwardly of the diametrical surfaces 56 at one end of each clamp plate, leaving a remaining finger portion 62 extending to the nominal outer circumference of each such clamp plate. A pair of bolts 63 extend through mating openings (FIG. 6) in each of the finger portions 62 to engage mating threaded openings drilled in the confronting diametrical surfaces 56 of the opposing clamp plate, so as to hold together the clamp plates making up the hub clamp assembly 52.

It should now be apparent that the driven pulley is attached to the bicycle wheel 17 in the following manner. Each of the clamp plates 55a and 55b is separately inserted through the spokes of the wheel 17 and positioned in surrounding relation to the wheel hub 53. The bolts 63 are then inserted through the openings in the finger portions 62 of the clamp plates, and those bolts are tightened sufficiently to securely engage the hub within the clamp assembly 52. The sheave 51 is next positioned on the left side of the bicycle wheel 17 outside of the wheel spokes, the axle of the bicycle wheel having previously been temporarily disconnected from the mounting hub 18 for that purpose, and the bolts 54 are inserted through mating openings in the clamp assembly 52 and the sheave 51. A spacer sleeve 64 (FIG. 4) surrounds each bolt 54 between the confronting surfaces of the clamp assembly 52 and the sheave 51; the spacer sleeves extend between the spokes 65 on the left side of the bicycle wheel 17, and protect the spokes from damage as the bolts are tightened to draw the clamp assembly and the sheave into mutual engagement. The driven pulley 42 is now completely assembled onto the bicycle wheel 17, and concentricity of the sheave 51 with the axis of rotation of the bicycle wheel is assured due to the concentric position of the clamp assembly 52 to which the sheave is secured.

Assembly of the motorized conversion apparatus 22 onto a conventional bicycle 10 is accomplished by first attaching the frame assembly 23 to the bicycle frame as described above, and then attaching the driven pulley 42 as previously described. The engine 38 is then attached to the frame assembly 23, and the primary drive belt 39 and secondary drive belt 41 are then positioned around the respective pulleys. Assembly is completed by attaching a conventional motorcycle-type twist grip throttle control 66 to the right handle bar of the bicycle, and routing the flexible throttle cable 67 along appropriate frame members of the bicycle to interconnect with the speed control mechanism of the engine 38. The motorized bicycle is now ready for operation.

Once the engine 38 is started, the rider can move forwardly simply by opening the throttle to increase engine speed, whereupon the centrifugal clutch 43 applies power through the drive belts to the bicycle wheel 17. Stopping or slowing of the bicycle is accomplished with the conventional coaster brake and/or hand brake of the bicycle, assisted by engine compression until speed is reduced to the point where the centrifugal clutch disengages. The simplicity of control provided by the present motorized bicycle conversion apparatus should be particularly appealing to relatively unexperienced riders who are unfamiliar with conventional motorcycle throttle, brake, clutch, and gear shift controls; or who may not desire to master such conventional controls.

It will be seen from the foregoing that the present motorized bicycle conversion apparatus is relatively economical to manufacture, and is easily attached to or disconnected from a conventional bicycle without requiring structural modification of the bicycle. Although the disclosed embodiment of the present invention is illustrated on a boy's bicycle, it will be apparent that a girl's bicycle lacking the frame member 15 is equally appropriate for conversion to a motorized bicycle according to the present teachings.

It should also be understood that the foregoing relates only to a preferred embodiment of the present invention, and that numerous changes and modifications may be made therein without departing from the spirit and the scope of the invention as defined in the following claims.

I claim:

1. Motorized propelling apparatus for attaching a motive means to the frame structure of a bicycle, said apparatus comprising in combination:
   a frame assembly configured to fit above the conventional rear wheel of a bicycle;
   said frame assembly comprising a rear portion to receive and support said motive means above the bicycle rear wheel, and a forward portion extending forwardly from said rear portion to be disposed in proximity to bicycle frame structure extending downwardly and rearwardly from beneath the bicycle seat to the rear wheel attachment of the bicycle frame;
   attachment means operatively associated with said forward portion of said frame assembly to securely engage the bicycle frame, thereby securing said frame assembly in position above the bicycle rear wheel;
   motive means mounted on said frame assembly in position substantially above the axis of rotation of the rear wheel;
   side brace means securely engaging the bicycle frame structure extending horizontally rearwardly from the bicycle crank housing to the rear wheel attachment;
   said side brace means comprising a pair of strut members connected to said frame assembly rearwardly of said motive means and extending downwardly and forwardly therefrom to a lower end for securement in proximate location with the bicycle frame horizontal structure extending forwardly from the rear wheel toward the crank housing of the bicycle, so that the weight of said frame assembly and said motive means is vertically supported by said strut members and transmitted to the horizontal frame structure of the bicycle between said rear wheel and said crank assembly; and
   drive means operatively interconnecting said motive means and said rear wheel;
   said drive means comprising pulley means attached to the rear wheel of the bicycle;
   said pulley means comprising a driven member operatively connected to said motive means and positioned on the outside of the rear wheel spokes;
   means disposed within said spokes and operatively engaging the hub of the rear wheel;
   means extending between said wheel spokes to operatively interconnect said drive means and said hub engaging means, so that the rear wheel is rotated in response to rotation of said driven member by said motive means;
   said hub engaging means being diametrically split to define a pair of clamp members each having a smooth arcuate hub engaging surface configured to provide a complementary fit on the circumference of said hub of the bicycle rear wheel;
   connecting means engaging each of said clamp member to draw said hub engaging surfaces into frictional engagement against the circumference of the hub;
   said means extending between the wheel spokes to interconnect the drive means and the hub engaging means comprising a plurality of bolts engaging said clamp members and extending between the spokes of the bicycle rear wheel to engage said driven member; and means protruding between said driven member and said clamp members, and also extending between said rear wheel spokes, to limit the extent to which the clamp members and driven means can be drawn together, so as to prevent damage to the spokes and the hub of the rear wheel as the clamp members and the driven member are drawn into mutual engagement by said fasteners and said bolts.

2. Apparatus as in claim 1, wherein:

said means protruding between the driven member and the clamp members comprises a spacer sleeve fitting around each of said bolts where the bolts extend between the wheel spokes, said spacer sleeve engaging confronting surfaces of the driven member and the clamp members in response to a predetermined minimum amount of spacing between said confronting surfaces.

* * * * *